US006993080B2

(12) United States Patent
Saunders et al.

(10) Patent No.: US 6,993,080 B2
(45) Date of Patent: Jan. 31, 2006

(54) SIGNAL PROCESSING

(75) Inventors: Nicholas Ian Saunders, Basingstoke (GB); Robert Mark Stefan Porter, Winchester (GB)

(73) Assignee: Sony United Kingdom Limited, Weybridge (GB)

( * ) Notice: Subject to any disclaimer, the term of this patent is extended or adjusted under 35 U.S.C. 154(b) by 628 days.

(21) Appl. No.: 10/079,713

(22) Filed: Feb. 19, 2002

(65) Prior Publication Data

US 2002/0136310 A1 Sep. 26, 2002

(30) Foreign Application Priority Data

Feb. 21, 2001 (GB) ................................... 0104296

(51) Int. Cl.
*H04N 7/12* (2006.01)

(52) U.S. Cl. ................................................. 375/240.25

(58) Field of Classification Search ............. 348/428.1, 348/571, 413.1, 584, 425.1; 375/240.12, 375/240.15, 240.01, 240.26, 240.25

See application file for complete search history.

(56) References Cited

U.S. PATENT DOCUMENTS

| | | | | |
|---|---|---|---|---|
| 6,529,555 | B1 * | 3/2003 | Saunders et al. | 375/240.26 |
| 6,611,624 | B1 * | 8/2003 | Zhang et al. | 382/232 |
| 6,643,325 | B2 * | 11/2003 | Webb et al. | 375/240.16 |
| 6,724,436 | B1 * | 4/2004 | Saunders et al. | 348/584 |
| 6,760,377 | B1 * | 7/2004 | Burns et al. | 375/240.15 |

FOREIGN PATENT DOCUMENTS

| | | |
|---|---|---|
| EP | 0 942 605 | 9/1999 |
| GB | 2 333 656 | 7/1999 |
| GB | 2 333 657 | 7/1999 |
| WO | WO 95 35628 | 12/1995 |

* cited by examiner

*Primary Examiner*—Vu Le
*Assistant Examiner*—Behrooz Senfi
(74) *Attorney, Agent, or Firm*—Frommer Lawrence & Haug LLP; William S. Frommer; Thomas F. Presson

(57) ABSTRACT

A decoder 2 decodes a first compressed digital video bitstream whilst preserving the compression parameters thereof, the compression parameters including a first buffer occupancy value VBV_1 representing the occupancy by the said first bitstream of a buffer of the decoder. A signal processor 40 processes the decompressed bitstream. An encoder 6 compresses the processed bitstream to produce a second compressed bitstream having a target bit rate, optionally with reuse of the said compression parameters of the first bitstream, the second bitstream having a second occupancy value VBV_2 representing the occupancy of a downstream decoder buffer by the said second bitstream. The encoder controls (i) the target bit rate of the second bitstream and (ii) the recoding of the second bitstream to meet the said target bit rate, the target bit rate being varied in dependence on one or both of (a) VBV_2 and (b) the difference between VBV_1 and VBV_2, and the degree of reuse of the said preserved parameters being varied in dependence on one or both of (a) the degree to which VBV_2 tends towards underflow and (b) the degree to which VBV_1 differs from VBV_2 tending towards underflow.

In addition, stuffing bits are added to the bitstream if VBV_2 is tending towards overflow of the downstream buffer and/or VBV_2 differs from VBV_1 tending towards overflow.

23 Claims, 4 Drawing Sheets

SIGNAL PROCESSING

BACKGROUND OF THE INVENTION

1. Field of the Invention

The present invention relates to a signal processing system, a method of signal processing and a computer program product arranged to implement the method. Embodiments of the invention relate to processing compressed video bit streams. Preferred embodiments relate to processing video bit streams compressed according to the MPEG 2 standard.

2. Description of the Prior Art

The invention and its background will be discussed by way of example with reference to MPEG-2 video bitstreams. However the invention is not limited to MPEG-2.

MPEG-2 is well known from for example ISO/IEC/13818-2, and will not be described in detail herein. MPEG-2 compressed video comprises groups of I, P and/or B frames known as GOPs, Groups of Pictures. I, P and B frames are well known. An I or Intra-encoded frame contains all the information of the frame independently of any other frame. A P frame in a GOP ultimately depends on an I frame and may depend on other P frames. A B frame of a GOP ultimately depends on an I-frame and may depend on P frames in the GOP. A B frame must not depend on another B frame.

A GOP typically comprises 12 or 15 frames comprising at least one I frame and several P and B frames. To correctly decode a GOP requires all the frames of the GOP, because a large part of the video information required to decode a B frame in the GOP is in a preceding and/or succeeding frame of the GOP. Likewise a large part of the video information required to decode a P frame is in a preceding frame of the GOP. More generally, a GOP must comprise at least one I frame. It may additionally comprise one or more P frames and/or B frames. For example, a GOP may comprise only an I frame and a B frame as in the SX system of SONY.

It is known to edit compressed video or otherwise process it. A known editing process is splicing. Splicing analogue signals is relatively straight forward and can be done at the boundary between adjacent frames, because each analogue frame contains the whole of the video information of that frame independently of other frames. Splicing can be done similarly in the digital domain for both compressed and uncompressed video data if all frames contain the whole video information of the frame. Thus it has been proposed to splice compressed video by reencoding an original GOP of I and P and/or B frames as all I frames and performing splicing on the I frames and then reencoding the I frames as a new GOP having the same structure as the original GOP. Other processing is also conveniently performed on I frames. Reencoding the original GOP as I frames involves decoding the GOP to baseband and recoding to I frames. Alternatively, it has been proposed to decode a GOP of compressed video to digital baseband (i.e. uncompressed digital video), process the baseband video, and reencode the processed video as a compressed bitstream without the intermediate step of recoding to I frames.

Decoding and reencoding tends to reduce image quality. It is known to maintain image quality by storing the compression parameters of compressed video before it is decompressed and to reuse those stored parameters, for at least frames which have not been changed by the processing, when reencoding the video. For example, I frames of the original compressed video are reencoded as I frames with the same compression parameters as in the original video. Likewise P and B frames of the original video may be reencoded as P and B frames with their original compression parameters. An example of such processing is disclosed in European Patent Application 00306696.6 (Atty. ref. I-99-21 S00P5205EP00, P7374EP).

It is possible that a compressed video bitstream is decoded to I frames or baseband and then reencoded as a compressed bitstream with simple processing which does not change the video such as simple transfer and/or storage.

It has been found that decoding a compressed bitstream to I frames and reencoding the bitstream, whether or not the decoded bitstream is processed so as to change the video, results in the number of bits per GOP of the reencoded bitstream differing from that of the original bitstream even if compression parameters are reused. The same occurs if the compressed bitstream is decoded to baseband and reencoded. This can cause the buffer of a downstream decoder to underflow or overflow.

It is desired to decode and reencode a compressed video bitstream whilst maintaining image quality and avoiding buffer underflow and overflow.

SUMMARY OF THE INVENTION

According to a first aspect of the invention, there is provided a signal processing system comprising:

- a decoder for decoding a first compressed digital video bitstream whilst preserving the compression parameters thereof, the compression parameters including a first buffer occupancy value V_1 representing the occupancy by the said first bitstream of a buffer of the decoder;
- a signal processor for processing the decompressed bitstream; and
- an encoder for compressing the processed bitstream to produce a second compressed bitstream having a target bit rate, optionally with reuse of the said compression parameters of the first bitstream, the second bitstream having a second occupancy value V_2 representing the occupancy of a downstream decoder buffer by the said second bitstream;
- wherein the encoder controls (i) the target bit rate of the second bitstream and (ii) the recoding of the second bitstream to meet the said target bit rate,
- the target bit rate being varied in dependence on one or both of (a) V_2 and (b) the difference between V_1 and V_2, and
- the degree of reuse of the said preserved parameters being varied in dependence on one or both of (a) the degree to which V_2 tends towards underflow and (b) the degree to which V_1 differs from V_2 tending towards underflow.

According to a second aspect of the invention, there is provided a method of processing a signal comprising the steps of:

- decoding a first compressed digital video bitstream whilst preserving the compression parameters thereof, the compression parameters including a first buffer occupancy value V_1 representing the occupancy by the said first bitstream of a buffer of the decoder;
- processing the decompressed bitstream; and
- compressing the processed bitstream to produce a second compressed bitstream having a target bit rate, optionally with reuse of the said compression parameters of the first bitstream, the second bitstream having a second occupancy value V_2 representing the occupancy of a downstream decoder buffer by the said second bitstream;

wherein the encoding controls (i) the target bit rate of the second bitstream and (ii) the recoding of the second bitstream to meet the said target bit rate, the target bit rate being varied in dependence on one or both of (a) V_2 and (b) the difference between V_1 and V_2, and the degree of reuse of the said preserved parameters being varied in dependence on one or both of (a) the degree to which V_2 tends towards underflow and (b) the degree to which V_1 differs from V_2 tending towards underflow According to a third aspect of the invention, there is provided a computer program product comprising instructions which when run on a suitable data processor implement the method of said second aspect of the invention.

Thus the invention avoids underflow whilst preserving image quality by reusing preserved parameters and maintaining a high bit rate when the tendency towards underflow is low, and reduces the reuse of the preserved parameters and reduces the bit rate as the tendency towards underflow increases. Preferably, the values of V_1 and V_2 are controlled so that they converge by controlling the bit rate.

According to a fourth aspect of the invention, there is provided a signal processing system comprising:

a decoder for decoding a first compressed digital video bitstream whilst preserving the compression parameters thereof, the compression parameters including a first buffer occupancy value V_1 representing the occupancy by the said first bitstream of a buffer of the decoder;

a signal processor for processing the decompressed bitstream; and an encoder for compressing the processed bitstream to produce a second compressed bitstream having a target bit rate, optionally with reuse of the said compression parameters of the first bitstream, the second bitstream having a second occupancy value V_2 representing the occupancy of a downstream decoder buffer by the said second bitstream;

wherein the encoder controls (i) the target bit rate of the second bitstream and (ii) the recoding of the second bitstream to meet the said target bit rate, and if V_2 is tending towards overflow of the downstream buffer and/or V_2 differs from V_1 tending towards overflow of the downstream buffer, the encoder adds stuffing bits to the bitstream and recodes the second bitstream reusing the said preserved parameters.

According to a fifth aspect of the invention, there is provided a method of processing a signal comprising the steps of:

decoding a first compressed digital video bitstream whilst preserving the compression parameters thereof, the compression parameters including a first buffer occupancy value V_1 representing the occupancy by the said first bitstream of a buffer of the decoder;

processing the decompressed bitstream; and compressing the processed bitstream to produce a second compressed bitstream having a target bit rate, optionally with reuse of the said compression parameters of the first bitstream, the second bitstream having a second occupancy value V_2 representing the occupancy of a downstream decoder buffer by the said second bitstream;

wherein the encoding controls (i) the target bit rate of the second bitstream and (ii) the recoding of the second bitstream to meet the said target bit rate, and if V_2 is tending towards overflow of the downstream buffer and/or V_2 differs from V_1 tending towards overflow of the downstream buffer, the encoder adds stuffing bits to the bitstream and recodes the second bitstream reusing the said preserved parameters.

According to a sixth aspect of the invention, there is provided a computer program product comprising instructions which when run on a suitable data processor implement the method of said fifth aspect of the invention.

Thus the invention reduces overflow of the downstream buffer whilst preserving image quality by reusing the preserved parameters and adding stuffing bits.

In preferred embodiments of the invention in which the bitstreams are compresssed according to the MPEG2 standard, V_1 and V_2 are video buffer verifier values VBV_1 and VBV_2.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
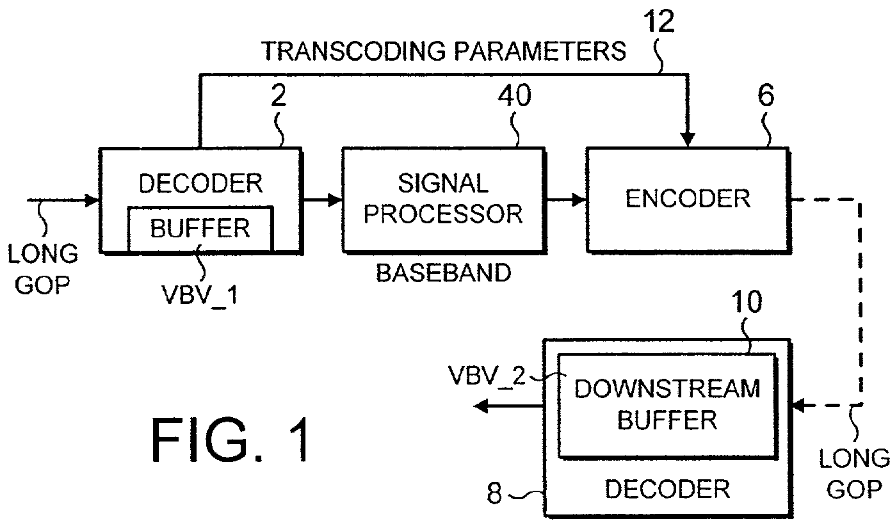
FIG. 1 is a schematic block diagram of a system for decoding compressed video to baseband, processing the decoded video and reencoding the processed video.

The illustrative system of FIG. 1 comprises a decoder 2 which receives a digital video bitstream compressed according to the MPEG 2 standard. The bitstream comprises a "long GOP" of frames, for example IBBPBBPBBPBB. The decoder 2 decompresses the compressed video to digital baseband. The compression parameters of the I, P and B frames are preserved for transfer to an encoder 6 as indicated by line 12. The parameters include for all frames (i.e. I, P and B):

Identification of the frame type, I P and B;

Quantiser scale;

DCT type ( field or frame); and

Quantiser matrix.

The parameters additionally include for predicted frames (i.e. P and B frames):

Prediction type (field or frame);

Macroblock mode; and

Motion vectors.

The decompressed baseband video is applied to a signal processor 40. The processor 40 may be, inter alia: simply a communications channel for transferring the decompressed video to the encoder 6; a store for storing the baseband video; an image processing system for example an editing system; and/or a video processing studio which operates at digital baseband.

The encoder 6 compresses the video from the processor 40 according to the MPEG2 standard producing in this example a long GOP which is preferably the same as the long GOP supplied to the decoder. The encoder uses the preserved transcoding parameters to compress the processed video and supplies the compressed video to a downstream decoder 8 having a buffer 10.

Figure 2:
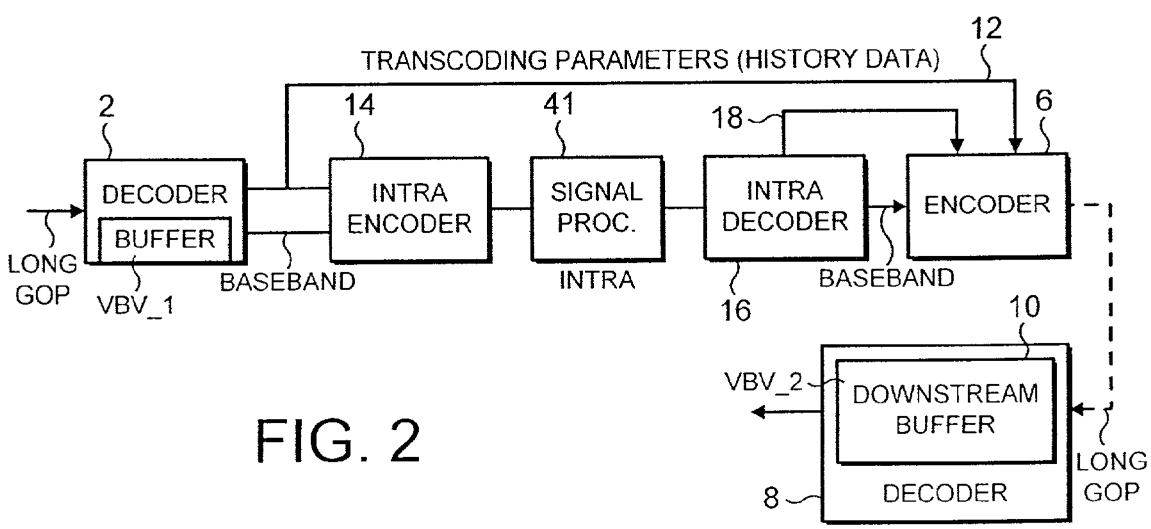
FIG. 2 is a schematic block diagram of a system for decoding compressed video and recoding it as I frames, processing the I frames and reencoding the processed I frames.

The system of FIG. 2 comprises a decoder 2 which receives a digital video bitstream compressed according to the MPEG 2 standard. The bitstream comprises a "long GOP" of 12 or 15 frames, for example IBBPBBPBBPBB. The decoder 2 decompresses the compressed video to digital baseband. The compression parameters of the I, P and B frames are preserved for transfer to an encoder 6 as indicated by line 12. The compression parameters are the same as set out above with reference to FIG. 1.

The decompressed baseband video is applied to an intra-frame encoder 14 which compresses the baseband video to I frames. The intra-encoder 14 uses the preserved parameters of the original I frames to recode those frames as I frames wherever possible within the constraints of the reencoded bitstream. The I frames are supplied to a signal processor 41. The processor 41 may be, inter alia: simply a communications channel for transferring the decompressed video; a store for storing the baseband video; an image processing system for example an editing system; and/or a video processing studio which operates on intra frames.

The processed I frames are supplied to a decoder 16 which decodes them to baseband preserving the compression parameters of the I frames as indicated by line 18 and transfers the baseband video to the encoder 6.

The encoder 6 compresses the video from the decoder 16 according to the MPEG2 standard producing in this example a long GOP which is preferably the same as the long GOP supplied to the decoder 2. The encoder uses the preserved transcoding parameters to compress the processed video and supplies the compressed video to a downstream decoder 8 having a buffer 10.

The decoder 2 of FIGS. 1 and 2 has a buffer which has an occupancy VBV_1. VBV_1 is known at the decoder 2 by measuring it. The downstream decoder has a buffer the occupancy of which is VBV_2. VBV_2 is estimated at the encoder 6.

Figure 3:
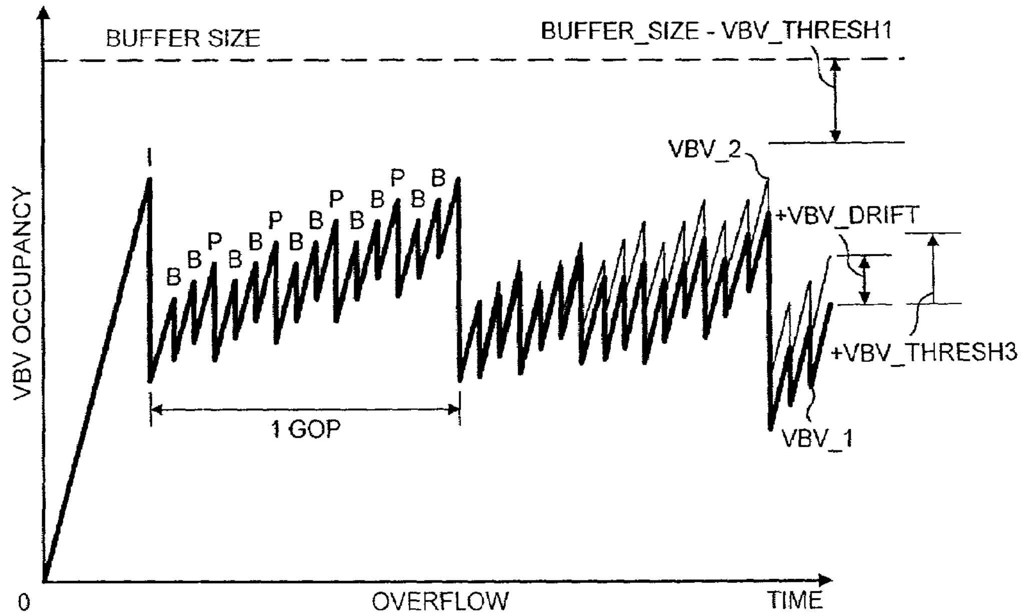
FIG. 3 is a diagram illustrating occupancy of a down stream buffer of the system of FIG. 1, 2, 5 or 7, and illustrating control of overflow in accordance with an embodiment of the invention.
Figure 4:
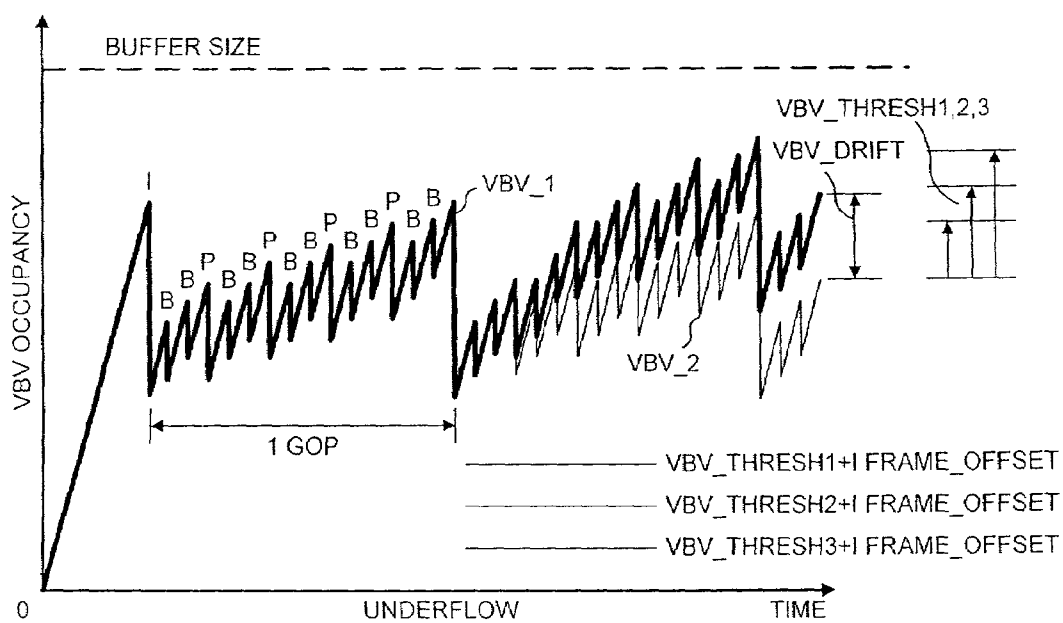
FIG. 4 is a diagram illustrating occupancy of a down stream buffer of the system of FIG. 1, 2 5 or 7, and illustrating control of underflow in accordance with an embodiment of the invention.

In both the systems of FIGS. 1 and 2, assuming that the processor 40 or 41 simply transfers the video without changing it in any way, it would be expected that, if the compression parameters are reused at the encoder 6 so as to reconstruct at the encoder 6 the long GOP input to the decoder 2, then VBV_1 will be the same as VBV_2. However in practice it is found that VBV_2 differs from VBV_1 and that VBV_1 and VBV_2 tend to drift apart. This is believed to be due to various factors. One factor is rounding errors in the inverse DCT transform in the decoder (s) and in the DCT transforms in the encoder(s). Other factors which arise in the system of FIG. 2 are changes in frame type which may arise from the decoding of the original bitstream and reencoding the bitstream; for example a frame which was originally I may be recoded as P or vice versa. In such cases the quantisation scales change. Such errors are likely to be worse in the system of FIG. 2 than in the system of FIG. 1. FIGS. 3 and 4 illustrate the drift of VBV_1 and VBV_2. The drift may cause the downstream buffer 10 to underflow or overflow if it is not controlled.

In accordance with an embodiment of the invention, the drift is controlled. Referring to FIGS. 3 and 4: VBV_2 is the occupancy of the downstream buffer 10 of FIGS. 1 and 2; VBV_1 is the occupancy of the buffer of the upstream decoder 2; and Buffer_size refers to the size of the downstream buffer 10. Thresholds VBV_Thresh1, VBV_Thresh2, and VBV_Thresh3 are set. These thresholds are all percentages of the Buffer_size. Examples of the thresholds are:

VBV_Thresh1 is 20% of Buffer_size;

VBV_Thresh2 is 15% of Buffer_size; and

VBV_Thresh3 is 10% of Buffer_size.

FIGS. 3 and 4 show in the heavy line GOPs of the original compressed bitstream input to the upstream decoder 2 and in the light line GOPs of the corresponding recoded bitstream produced by the encoder 6. The GOPs are long GOPs in the example of FIGS. 3 and 4 having a sequence of 15 frames IBBPBBPBBPBBPBB for example. Each type I, B and P of frame of the original bitstream is recoded as the same type I, B and P respectively of frame by the encoder 6.

A value VBV_drift is determined. VBV_drift is the difference (VBV_2−VBV_1) between the occupancy of the downstream buffer 10 by a frame of the recoded bitsream produced by the encoder 6 and the occupancy of the upstream buffer by the corresponding frame of the original bitstream. VBV_2 is also determined. VBV_2 and VBV_drift are determined once per GOP on the I frame of the GOP in this example. Alternatively, they may be determined on each frame of the GOP or on several but not all frames, for example on I and P frames but not B frames. It is preferable to determine them at least once per GOP on an I frame, because I frames have the greatest occupancy of the buffers and may (but not always) produce the greatest change in occupancy. In other embodiments of the invention, VBV_2 and VBV_drift may be determined every other GOP or at other suitable intervals.

Overflow and Positive VBV Drift

Referring to FIG. 3, which illustrates VBV_2 drifting from VBV_1 with a tendency towards overflow, VBV_drift and VBV_2 are determined once per GOP on the I frame at the start of each GOP.

If (VBV_2>Buffer_size−VBV_Thresh1) or (VBV_drift>VBV_Thresh3), then stuffing bits are added to the GOP following the I frame in the encoder 6 to reduce VBV_2. The GOP produced by the encoder reuses all the preserved transcoding parameters when there is a tendency to overflow. By way of explanation, VBV_2 is the occupancy of the downstream buffer 10. The occupancy of the downstream buffer is the inverse of the occupancy of the buffer of the encoder. Adding bits at the encoder to increase its occupancy results in decrease of the occupancy of the downstream buffer.

The threshold Buffer_size−VBV_Thresh1 is shown in FIG. 3. If VBV_2 exceeds that threshold the downstream buffer is likely to overflow.

The comparison of VBV_drift with VBV_Thresh3 is also shown in FIG. 3. If VBV_2 drifts too far from VBV_1 then that too indicates that the downstream buffer is tending towards overflow. Also, VBV_drift is monitored to ensure that VBV_1 and VBV_2 do not diverge too much. The number of stuffing bits added to the GOP is chosen so as to reduce VBV_2 towards VBV_1 and to allow VBV_2 to remain greater than VBV_1 so as to reduce the likelihood of future underflow. Preferably the stuffing bits are added until VBV_2=(Buffer_size−VBV_Thresh1) or (VBV_1+VBV_Thresh3) whichever value of VBV_2 is smaller.

Underflow and Negative VBV Drift

Referring to FIG. 4, which illustrates VBV_2 drifting from VBV_1 with a tendency towards underflow, the same values VBV_drift and VBV_2, which are determined once per GOP on the I frame at the start of each GOP, are used. In addition a value (Iframe_Offset) is used. This is preferably a predetermined fixed value representing the size of a typical I frame. Alternatively, it may be determined for each I frame by measuring the size of the I frame. The I frame_offset allows for the bits removed from the downstream buffer on decoding the I frame at the start of a GOP.

To reduce the likelihood of underflow and to reduce negative VBV drift, the target number of bits per GOP is reduced at the start of each GOP and the degree of reuse of the preserved transcoding parameters is reduced as the drift increases and as the likelihood of underflow increases. To reduce the likelihood of underflow, the target number of bits for the GOP is reduced. By way of explanation, VBV_2 is the occupancy of the downstream buffer 10. The occupancy of the downstream buffer is the inverse of the occupancy of the buffer of the encoder. Reducing the target number of bits at the encoder results in an increase of the occupancy of the downstream buffer.

In the present example:

If (VBV_2<VBV_Thresh1+Iframe_Offset) or (VBV_drift<minus VBV_Thresh3) then the target number of bits for the GOP is reduced by a small amount, the preserved transcoding parameters are reused on I and P frames, and B frames are recoded without reusing preserved parameters. These criteria denote a small VBV drift towards underflow. The said small amount is for example the value of VBV_drift or a proportion thereof.

If (VBV_2<VBV_Thresh2+Iframe_Offset) or (VBVdrift<minus VBV_Thresh2) then the target number of bits for the GOP is reduced by a medium amount, the preserved transcoding parameters are reused on I frames, and B and P frames are recoded without reusing preserved parameters. These criteria denote a medium VBV drift towards underflow. The said medium amount is for example the value of VBV_drift or a proportion thereof.

If (VBV_2<VBV_Thresh3+Iframe_Offset) or (VBVdrift<minus VBV_Thresh1) then the target number of bits for the GOP is reduced by a large amount, the preserved transcoding parameters are not reused on any frames, and all the I, P and B frames are recoded without reusing preserved parameters. These criteria denote a large VBV drift towards underflow. The said large amount is for example the value of VBV_drift or a proportion thereof.

The amounts by which the target number of bits ( and thus bit rate) is changed are chosen to ensure that the rate of change of bit rate is within acceptable bounds.

The above criteria all have two conditions (VBV_2<VBV_ThreshX+Iframe_Offset) and (VBVdrift<minus VBV_ThreshY). The decision on how much to reduce the target number of bits and the degree of reuse of the transcoding parameters is preferably decided on the worst case of the two conditions.

In this way, image quality is preserved as much as possible by reusing the transcoding parameters as much as possible.

It will be noted that the condition VBV drift<minus VBV_ThreshY indicates that VBVdrift is more negative than VBV_ThreshY, which is a negative value itself. In terms of magnitude then, |VBVdrift|>|VBV_ThreshY|.

Figure 5:
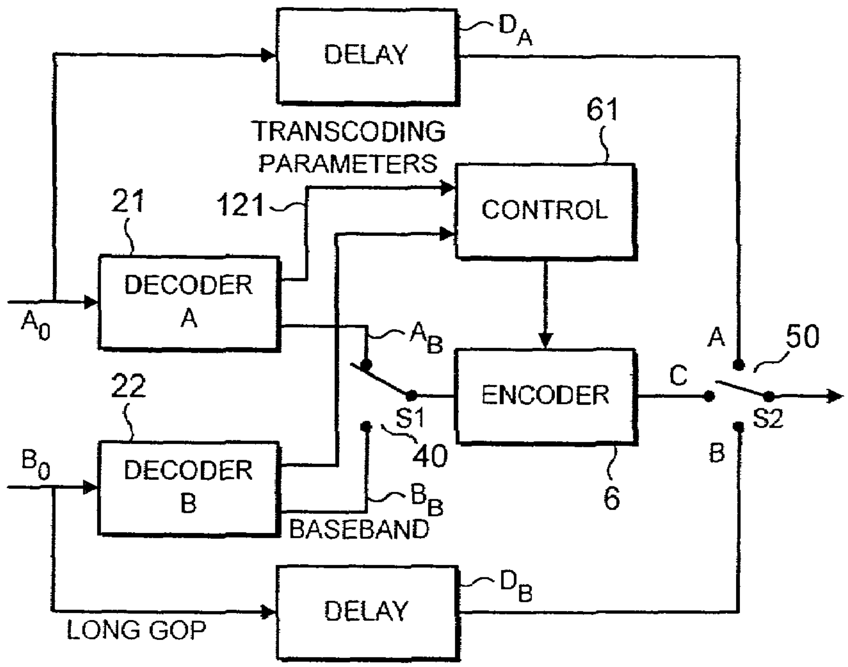
FIG. 5 is a schematic block diagram of a system for decoding compressed video to baseband, editing the decoded video and reencoding the edited video.
Figure 6:
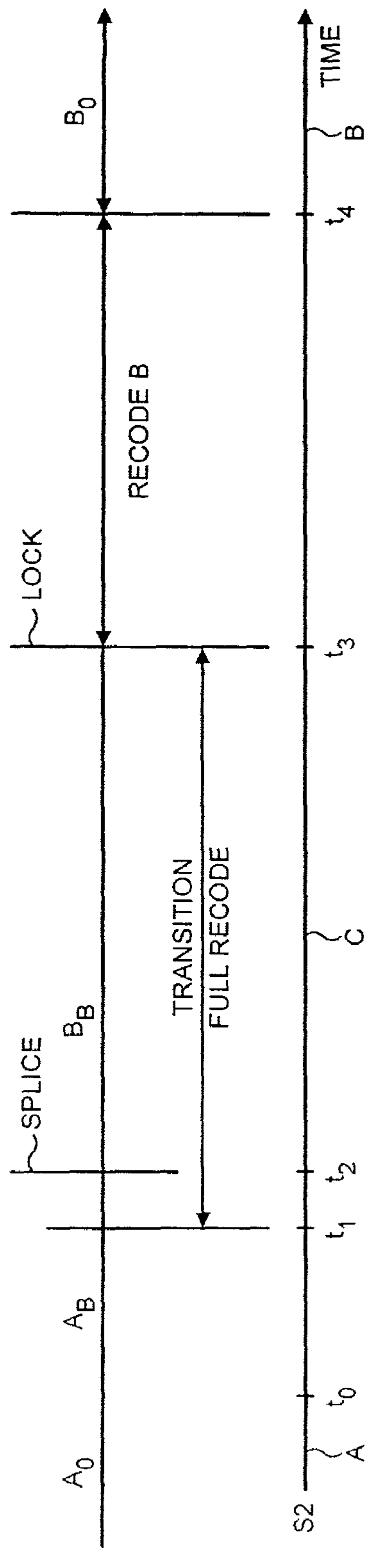
FIG. 6 is a timing diagram for explaining the operation of the system of FIG. 5.

Example of FIGS. 5 and 6

FIG. 5 shows an illustrative splicing system embodying the invention. Bitstreams A and B which are long GOP compressed bitstreams are supplied to inputs A and B of the system. The bitstream B is decoded to baseband and spliced onto the decoded baseband bitstream A at a splice point Splice by a splicer shown as a switch S1 to produce a spliced baseband bitstream C which is reencoded by an encoder 6. The encoder 6 is controlled by a controller 61 which receives the preserved transcoding parameters from the decoded bitstreams.

Referring to FIG. 6, prior to time t0, a bitstream A0 is fed from the input of a decoder 21 via a delay DA to input A of a switch S2 and thence to the output S0 of the system. From time t1 onwards to the splice time t2, A0 is decoded by decoder 21 to baseband and fed to input A of a splicer S1. A bitstream B0 is also decoded by a decoder 22 to baseband and fed to input B of the splicer S1. Up to time t2, the splicer S1 feeds A to the output C of the splicer. After time t2, the splicer feeds B to the output C. The encoder 6 operates in a transition period t1 to t3 in which the spliced bitstream is fully reencoded without use of, or with partial reuse of, preserved transcoding parameters. During this period reencoding is performed so as to provide a controlled transition from the VBV value of bitstream A to that of bitstream B. Preferably preserved I frame parameters are used to recode frames, which were originally I frames, as I frames. The manner in which that may be done is described in copending European patent application 00306699.0,(attorney reference I-99-19, S99P5130, P/7372) which is incorporated herein by reference. At time t3, the VBV of the bitstream matches that of bitstream B. Recoding of B continues from time t3 to time t4. At time t4, switch S2 switches from input C to input B and compressed bitstream B0 is supplied to the output S0 of the system. During the time period t3 to t4, the encoder operates as described with reference to FIGS. 1, 3 and 4 in accordance with the invention to reduce any drift of the VBV value of the bitstream produced by the encoder 6 from that of the original bitstream B0 to ensure that at time t4 the VBV values match as closely as possible.

Figure 7:
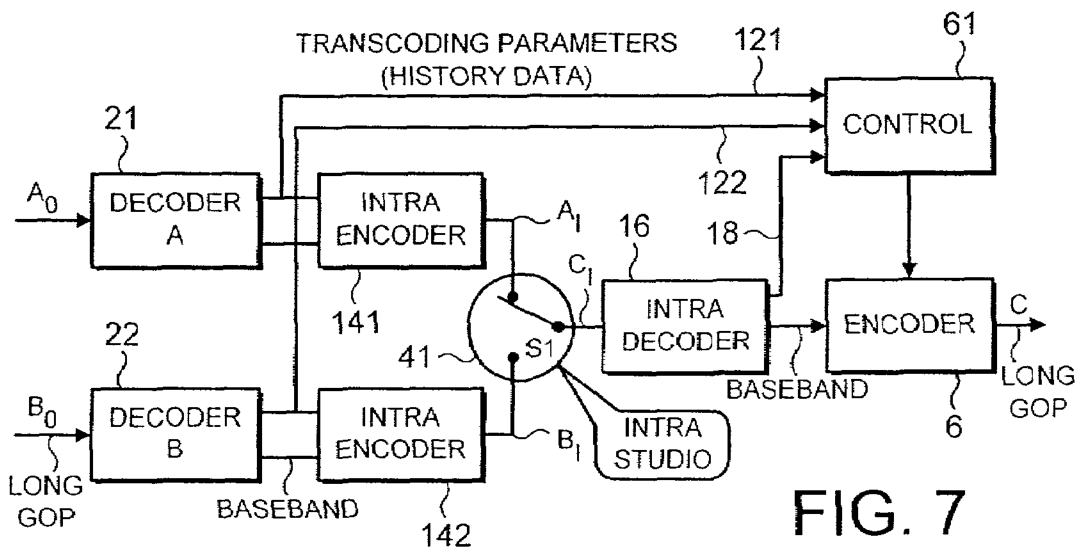
FIG. 7 is a schematic block diagram of a system for decoding compressed video and recoding it as I frames, editing the I frames and reencoding the edited I frames.
Figure 8:
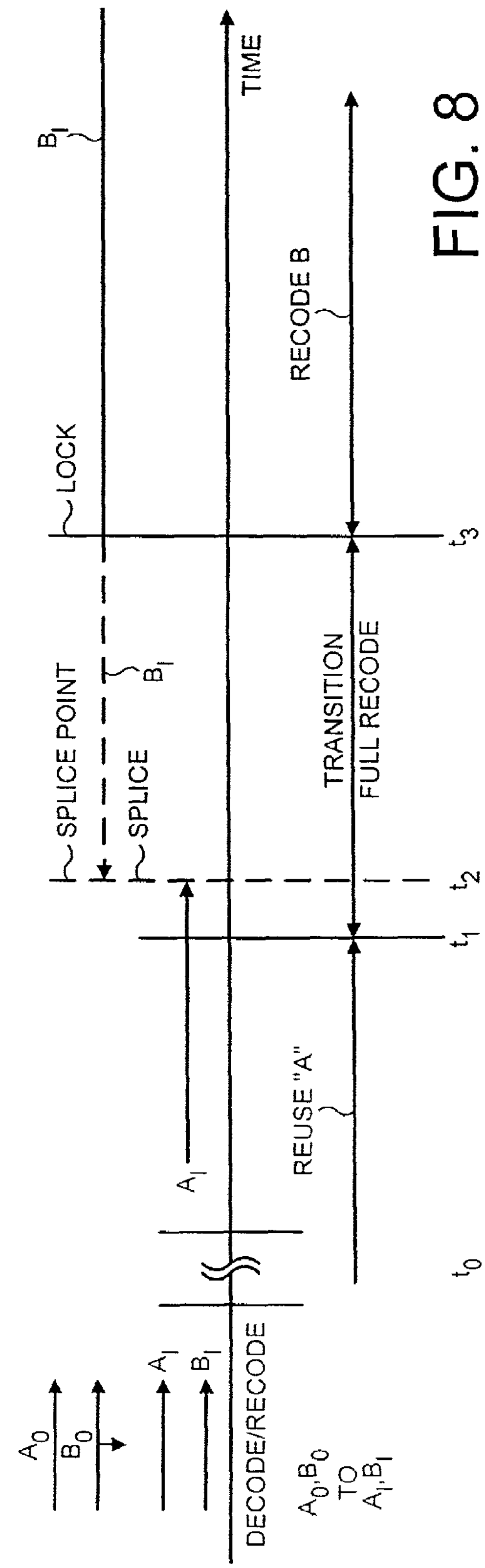
FIG. 8 is a timing diagram for explaining the operation of the system of FIG. 7.

Example of FIGS. 7 and 8

FIG. 7 shows an illustrative splicing system embodying the invention. Bitstreams A and B which are long GOP compressed bitstreams are supplied to inputs A and B of the system. Bitstream A is decoded by a decoder 21 and reencoded by an intra encoder 141 to a compressed bitstream consisting of I frames. Bitstream B is decoded by a decoder 22 and reencoded by an intra encoder 142 to a compressed bitstream consisting of I frames. I frame bitstream B is spliced onto the I frame bitstream A at a splice point Splice by a splicer 41 shown as a switch S1 to produce a spliced I frame bitstream C. The I frame bitstream C is reencoded as a long GOP compressed bitstream by an I frame decoder 16 and an encoder 6. The encoder 6 is controlled by a controller 61 which receives the preserved transcoding parameters from the decoded bitstreams.

The splicer 41 is typically in an intra frame studio. The bitstreams AI and BI are preferably stored in stores in the studio to be available for splicing. The spliced bitstream CI may be stored in a store in the studio. The stores may be tape and/or disc stores.

Referring to FIG. 8, from time t0 onwards to the splice time t2, A0 is decoded by decoder 21 and reencoded by an intra frame encoder 141 to I frames, reusing, wherever possible, at least the preserved parameters of the I frames of the original bitstream A0, and fed to input AI of a splicer S1. A bitstream B0 is also decoded by a decoder 22 and reencoded by an I frame encoder 142 to I frames, reusing, wherever possible, at least the preserved parameters of the I frames of the original bitstream Bo, and fed to input BI of the splicer S1. Up to time t2, the splicer S1 feeds A to the output CI of the splicer. After time t2, the splicer feeds B to the output CI. The decoder 16 and encoder 6 operate in a transition period t1 to t3 in which the spliced bitstream is fully reencoded without use of, or with partial use of, preserved transcoding parameters. During this period reencoding is performed so as to provide a controlled transition from the VBV value of bitstream A to that of bitstream B. Preferably preserved I frame parameters are used to recode frames, which were originally I frames, as I frames. The manner in which that may be done is described in copending European patent application 00306696.6,(attorney reference I-99-21, S99P5131, P7374) which is incorporated herein by reference. At time t3, the VBV of the bitstream C matches that of bitstream B. Recoding of B continues from time t3 onwards preferably with full reuse of transcoding parameters. If VBV drift occurs during the time period t3 onwards, the encoder 6 operates, as controlled by controller 61, as described with reference to FIGS. 2, 3 and 4 in accordance with the invention to reduce any drift of the VBV value of the bitstream produced by the encoder 6 from that of the original bitstream B0.

It will be noted that in the embodiment of FIGS. 7 and 8, the bitstreams A0 and B0 are decoded and reencoded as I frames prior to time t1. The present invention may be applied in the encoders 141 and 142 prior to time t1 wherever the reencoding makes full reuse of coding parameters.

It will be appreciated that the invention may be implemented in a programmable digital signal processor controlled by a computer program. Thus a computer program product, which implements the techniques described herein when run on the processor, is envisaged as an aspect of this invention.

Whilst the invention has been described in relation to the current MPEG2 standard, it will be appreciated that it could be applied to other compression systems.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A signal processing system comprising:

a decoder for decoding a first compressed digital video bitstream whilst preserving the compression parameters thereof, the compression parameters including a first buffer occupancy value V_1 representing the occupancy by the said first bitstream of a buffer of the decoder;

a signal processor for processing the decompressed bitstream; and an encoder for compressing the processed bitstream to produce a second compressed bitstream having a target bit rate, with reuse of the said compression parameters of the first bitstream, the second bitstream having a second occupancy value V_2 representing the occupancy of a downstream decoder buffer by the said second bitstream;

wherein the encoder controls (i) the target bit rate of the second bitstream and (ii) the recoding of the second bitstream to meet the said target bit rate, the target bit rate being varied in dependence on one or both of (a) V_2 and (b) the difference between V_1 and V_2, and the degree of reuse of the said preserved parameters being varied in dependence on one or both of (a) the degree to which V_2 tends towards underflow and (b) the degree to which V_1 differs from V_2 tending towards underflow.

2. A system according to claim 1, wherein if V_2 is within a predetermined range of underflow of the downstream buffer, then the second bitstream is encoded without reuse of the preserved parameters, otherwise the second bitstream is encoded with reuse of at least some preserved parameters.

3. A system according to claim 2, wherein if the difference between V_2 and V_1 exceeds a predetermined threshold value tending towards underflow of the downstream buffer, then the second bitstream is encoded without reuse of the preserved parameters, otherwise the second bitstream is encoded with reuse of at least some preserved parameters.

4. A system according to claim 3, wherein the compressed bitstreams comprise groups of intra frames and predicted frames, and if V_2 is less than a first V_2 threshold value Th1 then the target bit rate is reduced by a small amount, and preserved transcoding parameters are reused on intra frames and at least some predicted frames.

5. A system according to claim 3, wherein the compressed bitstreams comprise groups of intra frames and predicted frames, and if |(V2−V1)| is greater than a first (V2−V1) threshold, then the target bit rate is reduced by a small amount, and preserved transcoding parameters are reused on intra frames and at least some predicted frames.

6. A system according to claim 4, wherein the groups of frames include I, P and B frames and I and P frames are recoded with reuse of the preserved parameters, and B frames are recoded without reusing preserved parameters.

7. A system according to claim 4, wherein if V_2 is less than a second threshold value Th2, which is less than the said first threshold Th1 then the target bit rate is reduced by a medium amount, and preserved transcoding parameters are reused on intra frames but not on predicted frames.

8. A system according to claim 4, wherein if |(V2−V1)| is greater than a second (V_2−V_1) threshold but less than a third (V_2−V_1) threshold then the target bit rate is reduced by a medium amount, and preserved transcoding parameters are reused on intra frames but not on predicted frames.

9. A system according to claim 4, wherein if V_2 is less than a third threshold value Th3, which is less than the said second threshold Th2, then the target bit rate is reduced by a large amount, and preserved transcoding parameters are not reused on any frames.

10. A system according to claim 4, wherein if |(V_2−V_1)| is greater than said third (V2−V1) threshold then the target bit rate is reduced by a large amount, and preserved transcoding parameters are not reused on any frames.

11. A system according to claim 1, wherein stuffing bits are added to the bitstream if V_2 is tending towards overflow of the downstream buffer and/or V_2 differs from V_1 tending towards overflow.

12. A system according to claim 1, wherein the said signal processor comprises an intra-frame encoder to produce an intra frame bitstream, an intra frame signal processor and a decoder for decoding the processed intra frame bitstream to produce the said processed decompressed bitstream.

13. A system according to claim 1, wherein the said signal processor comprises one or more of: a store for storing the bitstream; and a communications channel for transferring the bitstream from the decoder to the encoder.

14. A system according to claim 1, wherein the said signal processor comprises an editing apparatus.

15. A signal processing system comprising:

a decoder for decoding a first compressed digital video bitstream whilst preserving the compression parameters thereof, the compression parameters including a first buffer occupancy value V_1 representing the occupancy by the said first bitstream of a buffer of the decoder;

a signal processor for processing the decompressed bitstream; and an encoder for compressing the processed bitstream to produce a second compressed bitstream having a target bit rate, with reuse of the said compression parameters of the first bitstream, the second bitstream having a second occupancy value V_2 representing the occupancy of a downstream decoder buffer by the said second bitstream;

wherein the encoder controls (i) the target bit rate of the second bitstream and (ii) the recoding of the second bitstream to meet the said target bit rate, and if V_2 is tending towards overflow of the downstream buffer and/or V_2 differs from V_1 tending towards overflow of the downstream buffer, the encoder adds stuffing bits to the bitstream and recodes the second bitstream reusing the said preserved parameters.

16. A system according to claim 15, wherein if V_2 is within a threshold range of the buffer size or (V_2–V_1) exceeds a further threshold level tending towards overflow, then stuffing bits are added to the bitstream.

17. A system according to claim 15, wherein the said signal processor comprises one or more of: a store for storing the bitstream; and a communications channel for transferring the bitstream from the decoder to the encoder.

18. A system according to claim 15, wherein the said signal processor comprises an editing apparatus.

19. A system according to claim 15, wherein the said signal processor comprises an intra-frame encoder to produce an intra frame bitstream, an intra frame signal processor and a decoder for decoding the processed intra frame bitstream to produce the said processed decompressed bitstream.

20. A method of processing a signal comprising the steps of:

decoding a first compressed digital video bitstream whilst preserving the compression parameters thereof, the compression parameters including a first buffer occupancy value V_1 representing the occupancy by the said first bitstream of a buffer of the decoder;

processing the decompressed bitstream; and compressing the processed bitstream to produce a second compressed bitstream having a target bit rate, with reuse of the said compression parameters of the first bitstream, the second bitstream having a second occupancy value V_2 representing the occupancy of a downstream decoder buffer by the said second bitstream;

wherein the encoding controls (i) the target bit rate of the second bitstream and (ii) the recoding of the second bitstream to meet the said target bit rate, the target bit rate being varied in dependence on one or both of (a) V_2 and (b) the difference between V_1 and V_2, and the degree of reuse of the said preserved parameters being varied in dependence on one or both of (a) the degree to which V_2 tends towards underflow and (b) the degree to which V_1 differs from V_2 tending towards underflow.

21. A computer program product arranged to carry out the method of claim 20, when run on a programmable digital signal processing system.

22. A method of processing a signal comprising the steps of:

decoding a first compressed digital video bitstream whilst preserving the compression parameters thereof, the compression parameters including a first buffer occupancy value V_1 representing the occupancy by the said first bitstream of a buffer of the decoder; processing the decompressed bitstream; and compressing the processed bitstream to produce a second compressed bitstream having a target bit rate, with reuse of the said compression parameters of the first bitstream, the second bitstream having a second occupancy value V_2 representing the occupancy of a downstream decoder buffer by the said second bitstream;

wherein the encoding controls (i) the target bit rate of the second bitstream and (ii) the recoding of the second bitstream to meet the said target bit rate, and if V_2 is tending towards overflow of the downstream buffer and/or V_2 differs from V_1 tending towards overflow of the downstream buffer, the encoder adds stuffing bits to the bitstream and recodes the second bitstream reusing the said preserved parameters.

23. A computer program product arranged to carry out the method of claim 22, when run on a programmable digital signal processing system.

* * * * *